3,061,593
HALIDES AS CHAIN INITIATORS FOR THE POLYMERIZATION OF LACTAMS
David Taber, Pittsburgh, Pa., assignor to General Aniline & Film Corporation, New York, N.Y., a corporation of Delaware
No Drawing. Filed Dec. 21, 1959, Ser. No. 860,678
9 Claims. (Cl. 260—78)

The present invention relates to the polymerization of lactams and particularly to halogens as chain initiators for the polymerization reaction.

It was observed as far back as 1880 (Berichte, vol. 21, page 2240, 1880, and Berichte, vol. 32, page 1266, 1899), that 4-aminobutyric acid and 5-aminovaleric acid failed to undergo intermolecular condensation and yielded only the five- and six-membered lactams. However, 70 years later, W. O. Ney et al. found that α-pyrrolidone, a five-membered lactam, in the presence of an alkaline polymerization catalyst proceeds via a ring chain polymerization to yield a polyamide of 4-aminobutyric acid in accordance with the following equation:

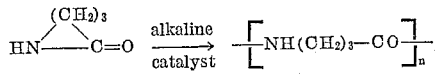

wherein $n$ represents a positive integer of recurring units. While useful polymers are obtained, considerable difficulty is encountered in obtaining satisfactory yields. In addition, difficulty is also encountered in obtaining polymers of relatively high molecular weights.

In U.S. Patent 2,739,959, W. O. Ney et al. teach in their Example 1 that only a small yield of a low molecular weight polymer is obtained when an alkaline polymerization catalyst is employed as the sole promoter when utilizing α-pyrrolidone as the monomer. To increase the molecular weight, these patentees suggest that the alkaline polymerization be conducted in the presence of a small amount of an acyl compound as initiator or activator. As activators they recommend acyl pyrrolidones, acyl dipyrrolidones, organic peroxides, anhydrous lactones and alkyl esters.

I have found that halogens, such as bromine and chlorine, are capable of acting very efficiently as chain initiators in the alkaline catalyzed copolymerization of not only five- and six-membered lactams such as α-pyrrolidone and α-piperidone, but also of five- to seven-membered thiolactams, such as γ-thiobutyrolactam, δ-thiovalerolactam and ε-thiocaprolactam. These halogens have the new and unexpected property of initiating the chain growth during the polymerization reaction.

The general conditions and factors utilized in the alkaline catalyzed polymerization of five-, six- and seven-membered lactams in accordance with the present invention are essentially those disclosed in the W. O. Ney et al. Patent 2,739,959 with the exception of the presence of halogens, such as chlorine and bromine, as the chain initiators. In general, the method of polymerizing the five- and seven-membered lactams in accordance with the present invention consist of first preparing an anhydrous solution of the alkali lactam in the same lactam used in preparing the alkali derivative. The alkali lactam usually employed is either sodio- or potassio-lactam and is obtained by reacting the five-, six- or seven-membered lactam with sodium or potassium metal or the hydroxide thereof. For example, if 2-pyrrolidone is chosen for polymerization, the alkali pyrrolidone is obtained by reacting the 2-pyrrolidone with either sodium or potassium metal or the hydroxide thereof and the alkali pyrrolidone is then dissolved in purified 2-pyrrolidone. The same procedure applies to 2-piperidone, thiovalerolactam, thiocaprolactam and the like. As an alternative the alkali metal derivative of the lactam may be prepared in situ by employing one equivalent of the alkali metal or hydroxide thereof with 5 to 10 equivalents of the lactam. After the alkali lactam has been prepared it is essential to remove the water therefrom (when an alkali metal hydroxide is employed) as rapidly as possible. The concentration of the alkali lactam employed may vary from 0.5 to 5.0 mole percent (percentages based on the five-, six- or seven-membered lactam), and may range from 0.1 to 10.0 mole percent. In a series of experiments, optimum yields were obtained with about 1 to 10 mole percent of alkali lactam, in excess of the amount required to react with all of the halogen groups of the initiator. (The total catalyst is approximately 3–12 mole percent where two equivalent percent of initiator are used and 2–4% where one equivalent percent of initiator is used.) The role of the alkali lactam is that of a catalyst and serves as a source of lactam anions.

The amount of chain initiator employed may vary from 0.1 to 10 equivalent percent (percentage based on the lactam employed). The concentration of the chain initiator chosen will depend on the conversion desired and the molecular weight sought. The rate of polymerization will depend of course to a large extent on the molar amount of chain initiator employed. With higher amounts faster rates are obtained. The polymerization is chain initiated at a temperature of from 25° to 75° C. and is accompanied by a mild exothermic reaction.

In bulk or mass polymerization, the addition of the chain initiator under a slow stream of dry nitrogen is followed by a thickening of the solution and gradual solidification of the mixture. The polymerization while employing either bromine or chlorine in accordance with the present invention, may be conducted in a dispersion of a five-, six- or seven-membered lactam and the corresponding alkali lactam in a non-solvent for the lactam. Suitable non-solvents of this type are the saturated and unsaturated (olefinic) aliphatic and alicyclic hydrocarbons, such as for example, pentane, heptane, hexane, 3-methyl-hexane, 2,2-dimethylpentane, cyclohexane, cyclopentane, cyclohexene, etc. The amount of non-solvent employed may range from 0.5 to 10 parts per 1 part of the lactam. The proportions might either be by weight or by volume. The physical state of the resulting polymer may vary from a thick curd to a fine powder depending on the conversion desired, ratio of non-solvent to monomer and type as well as rate of agitation.

For purpose of comparison, the following illustrative Examples A and B are given of the prior art polymerization of highly purified pyrrolidone, obtained from the same batch and purified in the same manner as the α-pyrrolidone employed in Examples I to III inclusive, in accordance with the process of the present invention.

*Example A*

A 500 cc. glass flask equipped for vacuum distillation was charged with 100 grams (1.18 moles) of highly purified α-pyrrolidone. There was then added 1 gram of potassium hydroxide flakes of 83% assay, the system immediately placed under a reduced pressure of 10 mm. and rapidly heated to reflux at 120–125° C. The vapors were condensed at a jacket temperature of 75° C. so as to permit the return of the α-pyrrolidone and at the same time the removal of water. After one hour at reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24 hour period, the mixture became turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of 3.1 in a 1% solution in meta cresol.

*Example B*

This example is an illustration of an alternate polymerization of highly purified pyrrolidone which follows closely the procedure of Example 1 of the W. O. Ney et al. Patent 2,739,959.

A 500 cc. glass flask, equipped for vacuum distillation, was charged with 120.0 grams of highly purified pyrrolidone. There was added 1.0 gram of potassium hydroxide flakes of 83% assay. The system was immediately placed under a reduced pressure of 1.0 mm. and rapidly heated to effect the distillation at 90 to 100° C., of 20 grams of pyrrolidone and water. The resulting clear, colorless solution in the still pot constituted a solution of potassio pyrrolidone in pyrrolidone. The solution was allowed to cool to room temperature and stand for 24 hours to the exclusion of atmospheric moisture and carbon dioxide. During this 24 hour period the mixture became turbid and a scant amount of solid was deposited. The contents were treated with 400 grams of distilled water, the solid filtered and thoroughly washed with water. The dried polymer weighed 0.5 grams, representing a conversion of 0.5%. The material was of low molecular weight as indicated by the relative viscosity of 3.4 in a 1% solution of meta cresol.

The following examples will illustrate the improved yields and high molecular weight polymerized lactams while employing bromine and chlorine as the polymerization chain initiator.

*Example I*

A 500 ml. glass flask was charged with 130 ml. of highly purified pyrrolidone and 3.5 grams (0.056 mole) of potassium hydroxide flakes assaying 90%. After removing water of reaction by distilling about 30 grams of liquid at a flash temperature of 127° and a pressure of 8.5 mm. of mercury, the liquid residue weighed 101.7 grams (99.5 grams of available monomer after substracting the weight of potassium ion) and consisted of a mixture of pyrrolidone and potassium pyrrolidone. At 29° C. there was introduced below the level of the mixture chlorine prepared from 0.84 gram of solid potassium permanganate and a solution of 4.65 ml. of concentrated hydrochloric acid and 1.1 ml. of water. The chlorine expected from such a mixture weighs 0.94 gram, or 0.013 mole. To remove hydrogen chloride and water, the gas was passed through water and concentrated sulfuric acid. The reaction temperature rose to 36°, then fell.

After 24.75 hours of reaction in an atmosphere of dry nitrogen, the solid product was scraped from the flask, stirred with several portions of distilled water in a Waring Blendor and filtered after each stirring, until the product was neutral to brilliant yellow indicator. After a final washing with methanol, the product, polypyrrolidone, was dried at 63°/4 mm. to give 21.2 grams, or a conversion of 21.3%. The relative viscosity (1 gram in 100 ml. of m-cresol) was 3.25.

*Example II*

In a manner entirely similar to the procedure described in Example I, treating 130 grams of highly purified pyrrolidone with 3.5 grams of potassium hydroxide flakes of 90% assay and distilling at 120°/10 mm., left a residue which weighed 101.8 grams, corresponding to 99.6 grams of available monomer. At 31° and under an atmosphere of dry nitrogen there was added 0.60 ml. (0.012 mole, assuming a density of 3.1 gram/ml.) of liquid bromine. The mixture turned very dark and the temperature rose to 52° in five minutes.

After 24 hours of reaction in an atmosphere of dry nitrogen, the hard cake was dissolved in 300 ml. of 90% formic acid and reprecipitated by adding to water. After filtration, the solid was stirred with fresh portions of distilled water, filtering between stirrings, until the suspension was at pH 5.1. After washing with methanol and drying at 80°/1 mm. the product, polypyrrolidone, weighed 63.5 grams (63.8% conversion) and had a relative viscosity (1 gram in 100 ml. of m-cresol) of 4.72.

Piperidone and five- and seven-membered thiolactams are also polymerized by the process of the present invention by the use of the halogen initiators, in particular piperidone, which gives substantially good conversion to polypiperidone. In order to more fully illustrate the preparation of piperidone by the process of the present invention, the following example is given.

*Example III*

A solution of potassium piperidone in piperidone was prepared from 120 grams of highly purified piperidone and 3.5 grams of potassium hydroxide of 90% assay and distilling at reduced pressure to a residue of 100.3 grams, representing 98.1 grams of available monomer. At 30° under an atmosphere of dry nitrogen there was added 0.60 ml. (0.012 mole) of bromine.

After 24 hours at room temperature under an atmosphere of nitrogen, the solid was dissolved in 250 ml. of 90% formic acid, reprecipitated with water and washed with water until the suspension was at pH 5.3. After a final washing with methanol, drying at 60°/10 mm. gave 46 grams of polypiperidone of relative viscosity (1 gram in 100 ml. of m-cresol) of 2.98.

*Example IV*

This example illustrates the use of an N-bromopyrrolidone as the chain initiator.

In the manner described in Example I, there was prepared, from 130 grams of highly purified pyrrolidone and 3.5 grams of 90% potassium hydroxide, after distilling about 30 grams at 10 mm., a catalyst-monomer mixture weighing 102.1 grams (99.9 grams of available monomer). At 30° C. there was added 0.98 gram (0.006 mole) of N-bromopyrrolidone prepared according to the directions of J. Tafel and M. Stem, Ber., 33, 2224 (1900). After 24 hours of reaction in an atmosphere of dry nitrogen, the product was removed from the flask by dissolving it in 90% formic acid. After reprecipitation from water, washing with water until the suspension had pH 5.3 and finally washing with methanol, drying at 80° C./5 mm., left 36.2 grams of polypyrrolidone (36.2% conversion) of relative viscosity (1 gram in 100 ml. of m-cresol) of 3.69.

*Example V*

Example IV was repeated with the exception that N-bromopyrrolidone was replaced by an equivalent amount of N-chloropyrrolidone prepared by a procedure similar to that of Tafel et al. Following washing with methanol and drying at 80° C./5 mm., there was obtained 37 grams of polypyrrolidone of a relative viscosity (1 gram in 100 ml. of m-cresol) of 3.752.

The conversion to K values from the relative viscosity given in the foregoing examples (c.=1) may be accurately performed by the utilization of special tables. The K value is defined by the following implicit function of Fikentscher, Cellulosechemie, 13, 60 (1932):

Relative viscosity=$10^c$ [$0.001K + 0.000075K^2/(1+0.0015Kc)$]

It is to be noted that the chain initiator concentration of either chlorine or bromine may vary from 0.05 to 5 moles based upon 85 grams (1 mole) of the polymerizable monomer in solution with its corresponding sodium or potassium derivative.

While the foregoing examples specifically show the polymerization of α-pyrrolidone and α-piperidone, it is to be noted that the chain initiators of the present invention are also applicable to the preparation of polymers of homologs of α-pyrrolidone and α-piperidone which contain an alkyl substituent of 1 to 4 carbon atoms in one or more of the 3, 4, and 5-positions, such as for example 3-methyl-2-pyrrolidone, 4-methyl-2-pyrrolidone, 4-ethyl-2-pyrrolidone, 3,3-dimethyl-2-pyrrolidone, 4,4-dimethyl-2-pyrrolidone, 3-methyl-2-pyrrolidone, 3-ethyl-2-piperidone, 5-methyl-2-pyrrolidone and 3,3,5-trimethyl-2-pyrrolidone.

In addition to the alkyl substituted α-pyrrolidones and α-piperidones, thiovalerolactam, thiocaprolactam and several other heterocyclic compounds containing one or more

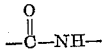

groups may be polymerized to yield a new class of polymeric compounds. The heterocyclic compounds containing such group are for example, glutarimide, 5-pyrazole, thiobarbituric acid, 2-thiohydantoin, 4-thiohydantoin, and diketopiperazine. By polymerizing disodio- or dipotassio-diketopiperazine in diketopiperazine while employing the chlorine and bromine in the present invention as chain initiators a polymer is obtained which upon fabrication into filaments yields a silk-like material.

The polymer chains present in the various types of polymers prepared in accordance with the present invention may be terminated by the formation not only of the acids and the metal and ammonium salts thereof but also as esters and amides by the reaction of the active polymer intermediate with alkaline compounds, hydroxyl-containing compounds or amines.

As examples of specific reagents which may be employed to terminate the polymer chains, otherwise than in a pyrrolidonyl or piperidonyl radical, may be mentioned water, sodium hydroxide, sodium methylate, methanol, ethanol, phenol, ammonia, ethylamine, aniline, diethanolamine. Reaction of the free polymer acid with alkaline agents such as metal hydroxides and amines gives the respective salts. The various terminations proceed with scission of the terminal lactam ring or one of the polymide linkages, particularly the linkage between the terminal —NH— linkage and the

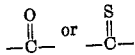

link thereto. From α-pyrrolidone polyamides of the nylon-4 type are obtained. From α-piperidone nylon-5 polyamides are obtained. Not only these polymers but polymers prepared from thiovalerolactam, thiocaprolactam, glutarimide, etc., are particularly useful products having a variety of industrial and technical applications. Because of their high molecular weights as indicated by the relative viscosity, they are useful in the production of textile fibres by the usual drawing procedure from a melt and spinning from solutions. They are also useful in the fabrication of films either by melt extrusion or film casting from solutions such as formic acid solution, glycollic or lactic acid solution followed by removal of the solvent. The resulting films are useful for food wrapping, in electrical applications as insulators, as bases for industrial tapes, as liners for glass and steel equipment. Useful articles may also be made by molding or extrusion processes.

The various types of polymers prepared in accordance with the present invention may be employed as such or blended with various other polymers and copolymers with or without the customary plasticizers and fillers to yield a new class of products having many industrial and technical applications.

The polymers prepared in accordance with the process of this invention are fiber forming materials useful for the spinning of continuous filament yarns as well as staple yarns. These yarns can be readily crimped, dyed, finished and woven to form useful textile fabrics. The polymer can be spun either from the melt or from solution. The high molecular weight polymers are also useful in fiber form for preparing cords of high strength for such uses as tire cord, ropes, hausers and fish nets. Because of their high water absorption the fibers and the cloth made from them are outstanding for their resistance to the build up of static electricity and for their comfort. These materials are useful in the weaving and knitting of cloth for wearing apparel of various kinds from suits and dresses to coats, hats and stockings. Undergarments of this fabric are particularly comfortable to wear.

The polymers are also useful for the preparation of numerous extruded articles, such as film, ribbon, tubing, roding, monofilament, and angular shapes. Extruded ribbon from these polymers is particularly useful for the preparation of woven seat covers for automobiles because of the low static electricity build up. Flat film from the polymers can be extruded either into a chilling bath or onto chilled rolls and obtained in a tough clear form. Blown film can also be prepared by extrusion through a special die fitted with an inlet for air. The film prepared from these polymers is particularly valuable for the wrapping of foods where water vapor permeability is important.

Extruded sheets of the polymer can be vacuum formed into useful shapes. Extruded tubing is particularly resistant most types of organic solvents including greases and oils, esters, amides, nitriles and ketones. Such tubing is particularly useful in hydraulic systems.

Because of the strength, toughness, resistance to abrasion and low shrinkage, the polymers are very useful in the preparation of molded articles. Such articles would include gears, spools, driving wheels, heel lifts for shoes, drawer pulls and knobs, reel parts, combs, bottle closures for chemicals, cups and lids. Molded chain links can be formed into durable chains for power coupling.

The polymers can also be used for the preparation of reinforced plastic articles, for example, by mixing with asbestos or glass fibers. The cloth prepared from these polymers can be used as the reinforcing material with other resins such as polyester resins, polystyrene, and epoxy resins. The polymers can also be used for belts. Special filled plastic polymers are useful in floor coverings. The polymers can be applied in other surface coatings where durability is an important factor. Because of their good brine resistance the polymers can be used in molded parts for water softening equipment.

The high water absorption of the polymers is of considerable value in fiber and monofilament applications. They are good for cool and static free auto seat covers, for summer shirts and clothing, for upholstery fabrics, for outdoor furniture webbing, for shoe uppers and shoe insets, for hosiery, dresses, sweaters, coats, and other wearing apparel, for car upholstery and interior trim, and for men's suits.

Other possible fiber uses include its use as filter cloth, awning material, fishing lines, fishing nets, cord, rope, tow-line, sewing thread, reinforcing for sox, parachute silk, parachute harness, safety belts, straps, tire cord, dry goods, curtains, drapes, netting, screens, hammocks, shoe laces, watch straps, typewriter ribbons and sutures.

If waterproofed, the fiber is useful for shower curtains, umbrellas, rain coats, tents, tarpaulins and sport jackets.

The monafilaments are also useful for fishing leaders, tennis racket strings, string for string instruments, bristles for brushes, toothbrushes, hairbrushes and clothes brushes.

Films of polypyrrolidone are good for food packaging because of vapor permeability. They are also useful for fruit and vegetable bags, for package wrapping, for seat covers, for swimming pool covers and liners, and for multipurpose bags, bag liners, fiber pack liners and box liners.

I claim:

1. The process of polymerizing a 5 to 7-membered ring lactam containing in its ring the group $$-NH-\overset{|}{C}=X$$

wherein X represents a member selected from the class consisting of oxygen and sulfur, which comprises forming an anhydrous solution of an alkali metal lactam in said lactam and polymerizing the same in contact with a polymerization initiator selector from the class consisting of N-bromopyrrolidone, N-chloropyrrolidone, molecular chlorine and molecular bromine.

2. The process of polymerizing α-pyrrolidone which comprises forming an anhydrous solution of an alkali metal pyrrolidone in α-pyrrolidone and polymerizing the same in contact with a molecular halogen selected from the class consisting of bromine and chlorine.

3. The process of polymerizing α-piperidone which comprises forming an anhydrous solution of an alkali metal piperidone in α-piperidone and polymerizing the same in contact with a molecular halogen selected from the class consisting of bromine and chlorine.

4. The process of polymerizing α-pyrrolidone which comprises forming an anhydrous solution of an alkali metal pyrrolidone in pyrrolidone and polymerizing the same in contact with molecular chlorine.

5. The process of polymerizing α-piperidone which comprises forming an anhydrous solution of an alkali metal piperidone in piperidone and polymerizing the same in contact with molecular bromine.

6. The process according to claim 1 wherein the polymerization initiator is chlorine.

7. The process according to claim 1 wherein the the polymerization initiator is bromine.

8. The process according to claim 1, wherein the polymerization initiator is N-bromopyrrolidone.

9. The process according to claim 1, wherein the polymerization initiator is N-chloropyrrolidone.

References Cited in the file of this patent

UNITED STATES PATENTS 2,893,980    Ham et al. _____ July 7, 1959